(12) United States Patent  
Conyers et al.

(10) Patent No.: US 7,574,234 B2  
(45) Date of Patent: *Aug. 11, 2009

(54) DYNAMIC READJUSTMENT OF POWER

(75) Inventors: David J. Conyers, Minneapolis, MN (US); Jeffrey J. Cannon, St. Louis Park, MN (US); Douglas D. Weaver, Plymouth, MN (US); Santosh K. Sonbarse, Eden Prairie, MN (US); William J. Mitchell, Eden Prairie, MN (US); Michael J. Hermel, Waseca, MN (US); Donald R. Bauman, Waseca, MN (US); Jerry Edward Toms, Shakopee, MN (US)

(73) Assignee: ADC Telecommunications, Inc., Eden Prairie, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 12/049,729

(22) Filed: Mar. 17, 2008

(65) Prior Publication Data

US 2008/0168199 A1 Jul. 10, 2008

Related U.S. Application Data

(63) Continuation of application No. 11/094,907, filed on Mar. 31, 2005, now Pat. No. 7,398,106.

(51) Int. Cl.
*H04M 1/00* (2006.01)
*H04B 1/38* (2006.01)
*H04B 7/00* (2006.01)

(52) U.S. Cl. .............. 455/557; 455/558; 455/550.1; 455/556.2; 455/560; 455/561; 455/522

(58) Field of Classification Search ............ 455/13.4, 455/41.2, 59, 66.1, 67.11, 67.13, 68–69, 455/70–74, 78, 123–126, 127.1–127.5, 128–129, 455/418–421, 422.1, 433–434, 450–451, 455/452.1–452.2, 466, 509, 511, 515, 517, 455/522, 524–526, 550.1, 552.1, 556.1–556.2, 455/557–558, 560–561, 574; 455/23, 42–44, 455/88–89, 115.1, 177.1–177.5, 161.2–161.3, 455/186.1, 205, 226.2, 233.1, 254, 256, 403, 455/453; 370/328–329, 332–33, 338, 341; 713/100, 375; 375/315–319
See application file for complete search history.

(56) References Cited

U.S. PATENT DOCUMENTS

| | | | |
|---|---|---|---|
| 4,183,054 A | 1/1980 | Patisaul et al. |
| 4,569,042 A | 2/1986 | Larson |
| 4,611,323 A | 9/1986 | Hessenmiiller |
| 4,628,501 A | 12/1986 | Loscoe |
| 4,654,843 A | 3/1987 | Roza et al. |
| 4,691,292 A | 9/1987 | Rothweiler |
| 4,999,831 A | 3/1991 | Grace |
| 5,184,347 A | 2/1993 | Farwell et al. |
| 5,193,109 A | 3/1993 | Chien-Yeh Lee |
| 5,243,598 A | 9/1993 | Lee |
| 5,276,691 A | 1/1994 | Kivari |
| 5,321,849 A | 6/1994 | Lemson |
| 5,339,184 A | 8/1994 | Tang |
| 5,544,222 A | 8/1996 | Robinson et al. |
| 5,619,504 A | 4/1997 | Van Grinsven et al. |
| 5,649,000 A | 7/1997 | Lee et al. |
| 5,701,294 A | 12/1997 | Ward et al. |
| 5,809,422 A | 9/1998 | Raleigh et al. |
| 5,854,978 A | 12/1998 | Heidari |
| 5,881,063 A | 3/1999 | Bement et al. |
| 5,896,574 A | 4/1999 | Bass, Sr. |
| 5,970,069 A | 10/1999 | Kumar et al. |
| 5,978,688 A | 11/1999 | Mullins et al. |
| 6,021,446 A | 2/2000 | Gentry, Jr. |
| 6,047,002 A | 4/2000 | Hartmann et al. |
| 6,091,765 A | 7/2000 | Pietzold, III et al. |
| 6,097,733 A | 8/2000 | Basu et al. |

| | | | |
|---|---|---|---|
| 6,188,898 B1 | 2/2001 | Phillips | |
| 6,219,561 B1 | 4/2001 | Raleigh | |
| 6,222,830 B1 | 4/2001 | Padovani et al. | |
| 6,233,456 B1 | 5/2001 | Schiff et al. | |
| 6,275,877 B1 | 8/2001 | Duda | |
| 6,363,421 B2 | 3/2002 | Barker et al. | |
| 6,381,289 B1* | 4/2002 | Dutta | 375/335 |
| 6,434,366 B1 | 8/2002 | Harrison et al. | |
| 6,463,060 B1 | 10/2002 | Sato et al. | |
| 6,496,546 B1 | 12/2002 | Allpress et al. | |
| 6,501,785 B1 | 12/2002 | Chang et al. | |
| 6,584,146 B2 | 6/2003 | Bose et al. | |
| 6,633,545 B1 | 10/2003 | Milbrandt | |
| 6,636,747 B2 | 10/2003 | Harada et al. | |
| 6,654,428 B1 | 11/2003 | Bose et al. | |
| 6,715,007 B1 | 3/2004 | Williams et al. | |
| 6,728,228 B1 | 4/2004 | Ostman et al. | |
| 6,731,947 B2 | 5/2004 | Hoagland et al. | |
| 6,751,187 B2 | 6/2004 | Walton et al. | |
| 6,760,882 B1 | 7/2004 | Gesbert et al. | |
| 6,775,303 B1 | 8/2004 | Rustad et al. | |
| 6,775,305 B1 | 8/2004 | Delvaux | |
| 6,788,961 B2 | 9/2004 | Repice et al. | |
| 6,801,975 B1 | 10/2004 | Young | |
| 6,810,270 B1 | 10/2004 | Grohn et al. | |
| 6,829,229 B1* | 12/2004 | Palermo et al. | 370/347 |
| 6,876,864 B1* | 4/2005 | Chapin | 455/509 |
| 6,882,851 B2 | 4/2005 | Sugar et al. | |
| 6,889,354 B2 | 5/2005 | Feldman et al. | |
| 6,898,721 B2 | 5/2005 | Schmidt | |
| 6,912,228 B1 | 6/2005 | Dahlman et al. | |
| 6,931,074 B1* | 8/2005 | Palermo et al. | 375/259 |
| 6,944,449 B1 | 9/2005 | Gandhi et al. | |
| 6,957,086 B2 | 10/2005 | Bahl et al. | |
| 6,977,930 B1 | 12/2005 | Epps et al. | |
| 7,006,442 B1 | 2/2006 | Abe et al. | |
| 7,016,668 B2* | 3/2006 | Vaidyanathan et al. | 455/418 |
| 7,035,932 B1 | 4/2006 | Dowling | |
| 7,058,789 B2 | 6/2006 | Henderson et al. | |
| 7,069,574 B1 | 6/2006 | Adams et al. | |
| 7,072,413 B2 | 7/2006 | Walton et al. | |
| 7,099,346 B1* | 8/2006 | Kanterakis | 370/431 |
| 7,099,687 B1 | 8/2006 | Makela et al. | |
| 7,103,044 B1 | 9/2006 | Keller et al. | |
| 7,116,682 B1* | 10/2006 | Waclawsky et al. | 370/468 |
| 7,151,925 B2* | 12/2006 | Ting et al. | 455/418 |
| 7,190,682 B2 | 3/2007 | Shepherd et al. | |
| 7,191,262 B2 | 3/2007 | Sleeman | |
| 7,203,488 B2 | 4/2007 | Luneau | |
| 7,269,200 B2 | 9/2007 | Igarashi | |
| 7,315,571 B1 | 1/2008 | Heidari et al. | |
| 7,324,786 B2 | 1/2008 | Parker | |
| 7,373,164 B2* | 5/2008 | Iacono et al. | 455/522 |
| 7,386,641 B2 | 6/2008 | Xu et al. | |
| 7,398,106 B2 | 7/2008 | Conyers et al. | |
| 7,423,988 B2 | 9/2008 | Hedin et al. | |
| 2001/0024430 A1 | 9/2001 | Sekine et al. | |
| 2001/0031621 A1 | 10/2001 | Schmutz | |
| 2001/0037395 A1 | 11/2001 | Sabat, Jr. et al. | |
| 2002/0001337 A1 | 1/2002 | Chauncey et al. | |
| 2002/0035633 A1 | 3/2002 | Bose et al. | |
| 2002/0056066 A1 | 5/2002 | Gesbert et al. | |
| 2002/0078247 A1 | 6/2002 | Lu et al. | |
| 2002/0093983 A1 | 7/2002 | Newberg et al. | |
| 2002/0169894 A1 | 11/2002 | Takla | |
| 2002/0186436 A1 | 12/2002 | Mani et al. | |
| 2002/0186674 A1 | 12/2002 | Mani et al. | |
| 2002/0187809 A1 | 12/2002 | Mani et al. | |
| 2002/0191565 A1 | 12/2002 | Mani et al. | |
| 2003/0003880 A1 | 1/2003 | Ling et al. | |
| 2003/0016701 A1 | 1/2003 | Hinson | |
| 2003/0036359 A1 | 2/2003 | Dent et al. | |
| 2003/0050098 A1 | 3/2003 | D'Agati et al. | |
| 2003/0125040 A1 | 7/2003 | Walton et al. | |
| 2003/0142649 A1 | 7/2003 | Taniguchi | |
| 2004/0001429 A1 | 1/2004 | Ma et al. | |
| 2004/0005866 A1 | 1/2004 | Igarashi | |
| 2004/0033806 A1 | 2/2004 | Daniel et al. | |
| 2004/0042387 A1 | 3/2004 | Geile | |
| 2004/0046016 A1 | 3/2004 | Becker et al. | |
| 2004/0132477 A1* | 7/2004 | Lundby et al. | 455/522 |
| 2004/0156328 A1 | 8/2004 | Walton et al. | |
| 2004/0156449 A1 | 8/2004 | Bose et al. | |
| 2004/0198410 A1* | 10/2004 | Shepherd et al. | 455/550.1 |
| 2004/0198453 A1 | 10/2004 | Cutrer et al. | |
| 2004/0209580 A1 | 10/2004 | Bose et al. | |
| 2005/0002444 A1 | 1/2005 | Wei et al. | |
| 2005/0033519 A1 | 2/2005 | Fenton | |
| 2005/0041746 A1* | 2/2005 | Rosen et al. | 375/242 |
| 2005/0083876 A1 | 4/2005 | Vialen et al. | |
| 2005/0138383 A1 | 6/2005 | Vainstein | |
| 2005/0147024 A1 | 7/2005 | Jung et al. | |
| 2005/0190855 A1 | 9/2005 | Jin et al. | |
| 2005/0280564 A1 | 12/2005 | Lee | |
| 2006/0015674 A1 | 1/2006 | Murotake | |
| 2006/0034242 A1 | 2/2006 | Proctor | |
| 2006/0141957 A1 | 6/2006 | Fischer et al. | |
| 2006/0206628 A1 | 9/2006 | Erez | |
| 2006/0221913 A1 | 10/2006 | Hermel et al. | |
| 2006/0222019 A1 | 10/2006 | Hedin et al. | |
| 2006/0222020 A1 | 10/2006 | Hedin et al. | |
| 2006/0222054 A1 | 10/2006 | Conyers et al. | |
| 2006/0222087 A1 | 10/2006 | Bauman et al. | |
| 2006/0223468 A1 | 10/2006 | Toms et al. | |
| 2006/0223514 A1 | 10/2006 | Weaver et al. | |
| 2006/0223515 A1 | 10/2006 | Hermel et al. | |
| 2006/0223572 A1 | 10/2006 | Hedin et al. | |
| 2006/0223578 A1 | 10/2006 | Conyers et al. | |
| 2006/0227736 A1 | 10/2006 | Conyers et al. | |
| 2006/0227737 A1 | 10/2006 | Hedin et al. | |
| 2006/0227805 A1 | 10/2006 | Hedin et al. | |
| 2007/0032241 A1 | 2/2007 | Busch et al. | |
| 2008/0025211 A1 | 1/2008 | Karaoguz et al. | |
| 2008/0137575 A1 | 6/2008 | Conyers et al. | |
| 2008/0168199 A1 | 7/2008 | Conyers et al. | |
| 2008/0254784 A1 | 10/2008 | Hedin et al. | |

FOREIGN PATENT DOCUMENTS

| | | |
|---|---|---|
| EP | 0391597 | 10/1990 |
| EP | 0936453 | 8/1999 |
| EP | 1211817 | 6/2002 |
| WO | 9115927 | 10/1991 |
| WO | 0159993 | 8/2001 |
| WO | 2004047316 | 6/2004 |

OTHER PUBLICATIONS

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.

Harvey et al., "Cordless Communications Utilising Radio Over Fibre Techniques for the Local Loop", "IEEE International Conference on Communications", , pp. 1171-1175, Publisher: IEEE.

Harvey et al., "Cordless Communications Utilising Radio Over Fibre Techniques for the Local Loop", "IEEE International Conference on Communications", Jun. 1991, pp. 1171-1175, Publisher: IEEE.

\* cited by examiner

*Primary Examiner*—Meless N Zewdu
(74) *Attorney, Agent, or Firm*—Fogg & Powers LLC

(57) ABSTRACT

System and methods for the dynamic readjustment of power are provided. In one embodiment a communications system comprises a base station including one or more radio head interface modules and a signal processing module, the radio head interface modules adapted to communicate with the signal processing module. The signal processing module performs modulation and demodulation of voice and data streams using one or more air interface protocols. The system further comprises a radio head unit coupled to the radio head interface modules over one or more transport mediums. The radio head unit communicates with one or more subscriber units using the air interface protocols. The radio head interface modules receive power level adjustment parameters from the signal processing module for one or more logical channels. The one or more radio head interface modules reconfigure a signal gain of one or more communications channels based on the power level adjustment parameters.

18 Claims, 4 Drawing Sheets

DYNAMIC READJUSTMENT OF POWER

CROSS REFERENCES TO RELATED APPLICATIONS

This application is a continuation of application Ser. No. 11/094,907 filed on Mar. 31, 2005, entitled "DYNAMIC READJUSTMENT OF POWER" (currently pending) which is hereby incorporated herein by reference.

This application is related to the following co-pending United States patent applications, all filed on Mar. 31, 2005, and all of which are hereby incorporated herein by reference:

U.S. patent application Ser. No. 11/095,788 (entitled "DYNAMIC FREQUENCY HOPPING") and which is referred to here as the '672 application;

U.S. patent application Ser. No. 11/095,628 (entitled "DYNAMIC DIGITAL UP AND DOWN CONVERTERS") and which is referred to here as the '673 application;

U.S. patent application Ser. No. 11/095,789 (entitled "DYNAMIC RECONFIGURATION OF RESOURCES THROUGH PAGE HEADERS") and which is referred to here as the '675 application;

U.S. patent application Ser. No. 11/094,848 (entitled "SIGNAL ENHANCEMENT THROUGH DIVERSITY") and which is referred to here as the '676 application;

U.S. patent application Ser. No. 11/095,111 (entitled "SNMP MANAGEMENT IN A SOFTWARE DEFINED RADIO") and which is referred to here as the '677 application;

U.S. patent application Ser. No. 11/095,112 (entitled "TIME STAMP IN THE REVERSE PATH") and which is referred to here as the '678 application;

U.S. patent application Ser. No. 11/094,949 (entitled "BUFFERS HANDLING MULTIPLE PROTOCOLS") and which is referred to here as the '679 application;

U.S. patent application Ser. No. 11/095,113 (entitled "TIME START IN THE FORWARD PATH") and which is referred to here as the '680 application;

U.S. patent application Ser. No. 11/094,950 (entitled "LOSS OF PAGE SYNCHRONIZATION") and which is referred to here as the '681 application;

U.S. patent application Ser. No. 11/094,947 (entitled "DYNAMIC REALLOCATION OF BANDWIDTH AND MODULATION PROTOCOLS") and which is referred to here as the '684 application;

U.S. patent application Ser. No. 11/095,150 (entitled "METHODS AND SYSTEMS FOR HANDLING UNDERFLOW AND OVERFLOW IN A SOFTWARE DEFINED RADIO") and which is referred to here as the '686 application; and U.S. patent application Ser. No. 11/095,779 (entitled "INTEGRATED NETWORK MANAGEMENT OF A SOFTWARE DEFINED RADIO SYSTEM") and which is referred to here as the '700 application.

TECHNICAL FIELD

The following description relates to communication systems and in particular to wireless communication systems.

BACKGROUND

Many changes are taking place in the way wireless communication networks are being deployed. Some of the changes are being driven by the adoption of new mobile communications standards. The introduction of software defined radios to wireless telecommunications has led to the generation of software and hardware solutions to meet the new standards.

A software defined radio (SDR) uses software for the modulation and demodulation of radio signals. The use of reprogrammable software allows key radio parameters, such as frequency and modulation protocols to be modified without the need to alter the underlying hardware of the system. Additionally, SDRs allow a single device to support multiple configurations which previously would have required multiple hardware devices. One example of a software defined radio is the Vanu Software Radio produced by Vanu, Inc. (See U.S. Pat. No. 6,654,428).

Current mobile communication standards introduce physical and logical channels and pose new issues in the transport of information within the communication networks. Some modulation protocols that wireless communication networks operate with includes, but is not limited to, Advanced Mobile Phone System (AMPS), code division multiple access (CDMA), Wide-band CDMA (WCDMA), time division multiple access (TDMA), Global System for Mobile communications (GSM), Cellular Digital Packet Data (CDPD), Enhanced Data rates for GSM Evolution (EDGE), General Packet Radio Service (GPRS), Integrated Digital Enhanced Network (iDEN), and Orthogonal Frequency Division Multiplexing (OFDM).

Purchasing hardware designed to operate with only a single standard results in idle resources at times when network demand for that modulation standard is low. To avoid the expenses associated with operating and maintaining hardware dedicated to each standard, there is a need in the art today for communications network hardware that is modulation standard independent and can be dynamically reconfigured to support modulation standards based on the current demands on the network and operate with multiple standards simultaneously.

Another need generated by the adoption of new mobile communications standards is ability for communications network hardware to dynamically adjust the power levels of radio frequency transmissions in order to maintain acceptable signal quality as required by standards. Signal power level adjustments are required both in order to minimize co-channel interference and to conserve power.

For the reasons stated above, and for other reasons stated below that will become apparent to those skilled in the art upon reading and understanding the present specification, there is a need in the telecommunications industry for systems and methods for dynamically reconfigurable communication networks which can dynamically adjust communications signal gains.

SUMMARY

Embodiments of the present invention address the problem of adjusting the signal gains of communications signals transmitted through communications networks, as well as other problems and will be understood by reading and studying the following specification.

In one embodiment, a communications system is presented. A communications system comprises a base station including one or more radio head interface modules and a signal processing module, the radio head interface modules adapted to communicate with the signal processing module. The signal processing module performs modulation and demodulation of voice and data streams using one or more air interface protocols. The system further comprises a radio head unit coupled to the radio head interface modules over one or more transport mediums. The radio head unit communicates with one or more subscriber units using the air interface protocols. The radio head interface modules receive power level adjustment parameters from the signal processing module for one or more logical channels. The one or more radio head interface modules reconfigure a signal gain of one or more communications channels based on the power level adjustment parameters.

DRAWINGS

The present invention is more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout Figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention concern portions of a cellular telecommunications network that typically comprises one or more cellular antennas, a remote unit (also called a radio head) transmitting and receiving voice and/or data communications, and a base station (also commonly called a base transceiver station (BTS), or a server) that communicates data between the remote unit and a larger communication network (e.g. the public switched telephone network, or the Internet). One or more base stations are connected to a base station controller (BSC) which controls data communication flows in one or more connected base stations.

In some embodiments, communications between a BTS and a remote unit take place through two sets of data streams. Typically, forward logical channels carry data streams from the BTS through the remote unit to the end user device. Reverse logical channels carry data streams from the end user devices through the remote unit to the BTS. Each of the logical channels is assigned a radio frequency (RF) channel and a modulation protocol, which the remote unit uses to wirelessly communicate data with individual cellular devices.

Figure 1A:
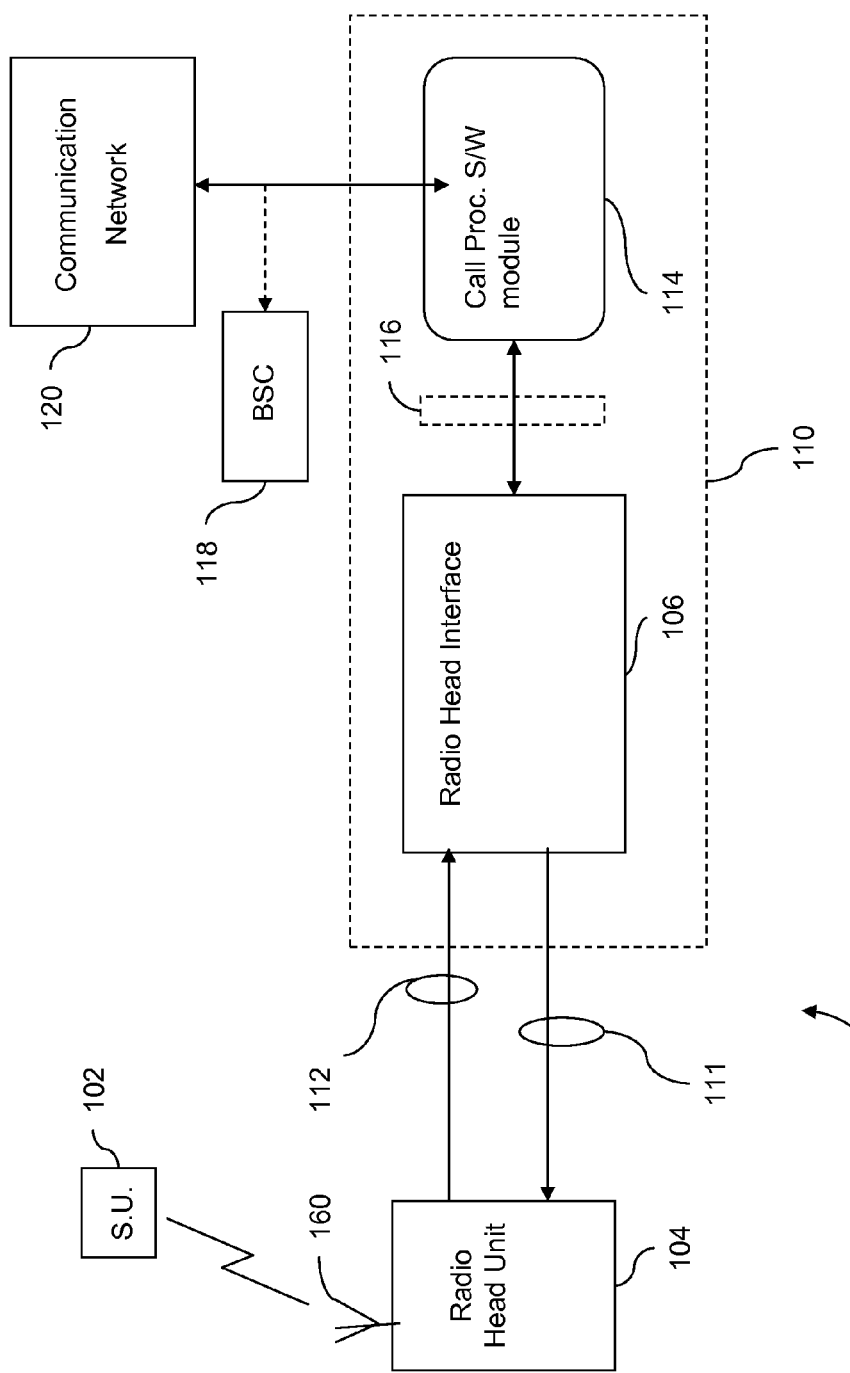
FIGS. 1A, 1B and 1C are block diagrams of one embodiment of a communications system of the present invention.

FIG. 1A is a block diagram of one embodiment of a communication system shown generally at 100. Communication system 100 includes one or more subscriber units 102 (or mobile devices 102) within a service area of a radio head unit 104. Radio head unit 104 is coupled to one or more servers 110 (or BTS 110) over one or more transport mediums 111, and 112. In one embodiment, transport mediums 111 and 112 comprise one or more high speed transport mediums.

In one embodiment, transport mediums 111 and 112 comprise one or more high speed digital data transport mediums. In one embodiment, transport mediums 111 and 112 comprises one or more optical fiber data paths. It would be well understood by one in the art upon reading this specification that transmit mediums 111 and 112 are not limited to optical fiber media but that embodiments include any optical or electrical transport media.

BTS 110 is connected to one or more communication networks 120 (e.g. public switched telephone network (PSTN), Internet, a cable network, or the like). In one embodiment, BTS 110 is connected to one or more communications networks through a base station controller (BSC) 118. In one embodiment, BTS 110 includes a call processing software module 114 (or call processing software 114) that interfaces between a radio head interface module 106 and one or more communication networks 120. In one embodiment, call processing software module 114 is comprised of one or more software applications. In one embodiment, call processing software module 114 also includes programming which implements an SDR with the BTS 110 and radio head unit 104 hardware, digitally performing waveform processing to modulate and demodulate radio signals transmitted and received, respectively, from cellular antennas 160. In one embodiment, call processing software module 114 is a Vanu, Inc., Vanu Software Radio.

In one embodiment, network 100 is a bidirectional network and as shown includes equipment for forward links (i.e. transmissions on forward logical channels from communications network 120 to mobile device 102) and reverse links (i.e. transmissions on reverse logical channels from mobile device 102 to communications network 120).

In some embodiments, additional reverse links are also provided that duplicate the reverse logical channels. In some embodiments, this set of duplicate reverse logical channels are called diversity channels. It should be understood that descriptions in this specification relating to embodiments of reverse logical channels also apply to such diversity channels. Further details pertaining to the advantages and operation of diversity channels are provided in the '676 application incorporated herein by reference.

Radio head unit 104 consists fundamentally of an antenna, a duplexer, a multicarrier power amplifier and low-noise amplifier. Radio head unit 104 communicates with one or more subscriber units 102 in a particular coverage area over forward and reverse links provided through radio head unit 104's associated antenna 160. In the forward link, call processing software module 114 generates representations of voice/data signals into data streams that are transported to radio head unit 104 via transport mediums 111. The forward link includes a forward radio frequency (RF) channel over which radio head unit 104 transmits the representations of voice/data signals to subscriber unit 102. Subscriber unit 102 transmits back to remote unit 104 over a reverse RF channel. Radio head unit 104 is responsible for receiving the RF signal from subscriber units 102, digitizing the RF signal and converting the digitized RF signal to a digital representation signal for transmission as a reverse link data stream over one or more transport mediums 112 to BTS 110. Subscriber unit 102 as used in this application includes, but is not limited to, cellular telephones, pagers, personal digital assistants, wireless modems, and other wireless terminals. Subscriber unit 102 may be a hand held device, a mobile station or a fixed station such as in a wireless local loop system. The radio head unit 104 communicates received signals to server 110 for routing to one or more communication networks 120.

In one embodiment, BTS 110 communicates with radio head unit 104 through radio head interface module 106 (or radio head interface 106). Radio head interface 106 establishes high speed digital communication paths for two or more sets of base band data stream logical channels and all communication between BTS 110 and radio head unit 104 goes through radio head interface 106. Radio head interface 106 and radio head unit 104 both handle multiple types of modulation protocols, and in different embodiments, one or more of the logical channels transmit data using a different modulation protocol than another logical channel. In one embodiment, radio head unit 104, radio head interface module 106, and call processing software module 114 handle modulation protocols for one or more of, but not limited to, Advanced Mobile Phone System (AMPS), code division multiple access (CDMA), Wide-band CDMA (WCDMA), time division multiple access (TDMA), Global System for Mobile communications (GSM), Cellular Digital Packet Data (CDPD), Enhanced Data rates for GSM Evolution (EDGE), General Packet Radio Service (GPRS), Integrated Digital Enhanced Network (iDEN), Orthogonal Frequency Division Multiplexing (OFDM), or any other appropriate modulation protocol. A modulation protocol is commonly also referred to as an air interface standard, a modulation standard, an air interface protocol, or an air interface modulation protocol. For each logical channel, call processing software module 114 performs modulation and demodulation of forward and reverse logical channel voice and data streams using one or more of the air interface standard protocols.

In one embodiment, radio head interface module 106 is coupled to BTS 110 through an interface device 116. In one embodiment, interface device 116 is one of, but not limited to a PCI-X interface, an ATCA interface, a PCI Express interface, a Gigabit Ethernet interface, a SCSI interface, a Rocket I/O interface, a UDP/IP link interface, a TCP/IP link interface, a Serial ATA interface, a Card bus for PCMIA card interface, a high speed serial interface or a high speed parallel interface.

During initial configuration of communication system 100, digital up-converter (DUC) and digital down-converter (DDC) filter parameters and sampling rates are loaded into radio head interface 106 for one or more of the protocols supported by radio head unit 104. Such parameters include, but are not limited to, filter parameters and sampling rates necessary to support valid RF channel, signal bandwidth, signal gain, and protocol configurations. Additional details regarding the configuration and operation of DUCs and DDCs are discussed in the '673 application, incorporated herein by reference. In one embodiment, the parameters are stored in a table in memory in radio head interface 106.

Embodiments of the present invention enable radio head interface 106 to adjust the signal gain (i.e. the signal power level) of RF signals transmitted by radio head unit 104 and the signal gain of digitized RF signals received from radio head unit 104 by radio head interface 106.

Figure 1B:
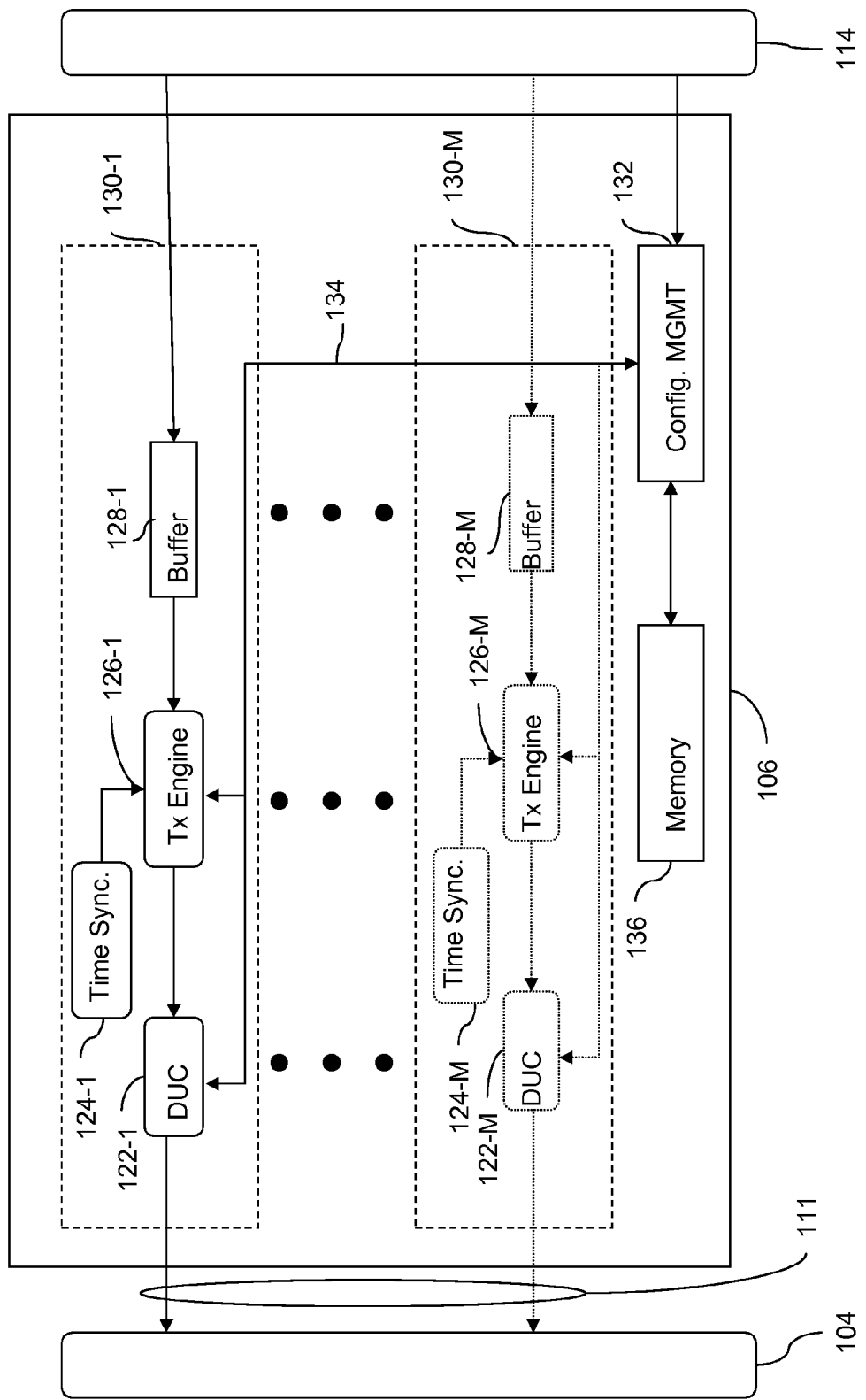

FIG. 1B illustrates one embodiment of a forward logical channel 130-1 data path. A radio head interface forward logical channel comprises a transmit buffer 128-1, a transmit engine 126-1, a DUC 122-1 and a time synchronizer 124-1. In operation, in one embodiment, transmit buffer 128-1 receives a page of complex data samples from call processing software 114. Transmit engine 126-1 removes the page of complex data samples from the transmit buffer 128-1 and sends the data samples to DUC 122-1. In one embodiment, transmit engine 126-1 holds the page of complex data samples until time synchronizer 124-1 determines that the current time matches a start time code embedded within the page. When the two times match, transmit engine 126-1 starts transmitting the page of complex data samples to DUC 122-1.

In one embodiment, call processing software 114 modulates representations of voice/data signals for forward logical channel 130-1 to an intermediate (or baseband) frequency to produce a page of a first set of complex RF data samples. DUC 122-1 converts the page of the first set of complex RF data samples from the baseband frequency used by call processing software 114 into a digital stream of representations of voice/data signals modulated at a center frequency designated for the RF channel assigned to logical channel 130-1, and outputs the digital stream as a second set of complex RF data samples. In one embodiment, the first set of complex RF data samples are 16 bit data samples. In one embodiment, the second set of complex RF data samples are 14 bit data samples. Embodiments of the present invention provide for dynamic readjustment of the signal power level (i.e. the signal gain) of the signal broadcasted by radio head unit 104 by reconfiguring DUC 122-1 with filter parameters that either increase of decrease the signal amplitudes of the complex RF data samples processed by DUC 122-1. Increased signal amplitude results in higher power output from 104's RF transmitter while decreased signal amplitudes result in lower power output.

In one embodiment, radio head interface card 106 comprises a plurality of M forward logical channels 130-1 through 130-M each having transmit buffers 128-1 through 126-M, transmit engines 126-1 through 126-M, DUCs 122-1 through 122-M and time synchronizers 124-1 through 124-M, each operating as described herein.

In one embodiment, radio head interface 106 is dynamically reconfigured to adjust the signal power level of data signals transmitted through forward logical channel 130-1. In operation, in one embodiment, configuration management unit 132 receives information from call processing software module 114 to adjust the signal power level of logical channel 130-1. Configuration management unit 132 looks up the associated parameters for the desired signal gain from the table located in memory 136. Through control channel 134, configuration management unit 132 loads appropriate filter coefficients to DUC 122-1. In one embodiment, DUC 122-1 is adapted with a buffer memory which holds the parameters received from configuration management unit 132. In one embodiment, transmit engine 126-1 sends a synchronization signal to DUC 122-1 to load the parameters from buffer memory into DUC 122-1's active registers. Once the parameters are loaded into the active registers, logical channel 130-1 amplifies forward link data samples based on the signal power level specified by call processing software module 114.

In one embodiment, radio head interface 106 is dynamically reconfigured to adjust reverse logical channel 140-1 signal gain for reverse link data samples. Increasing or decreasing the signal gain of a reverse logical channel may be desired in situations where changes in network hardware (e.g. replacement of a cellular antenna on radio head 104) alter the overall signal gain of a logical channel. In other embodiments utilizing diversity logical channels, dynamic adjustment of signal gains for associated reverse and diversity logical channels allows the two reverse link data stream signal power levels to be equalized independent of diverse network hardware such as, but not limited to, antennas with different gains.

Figure 1C:
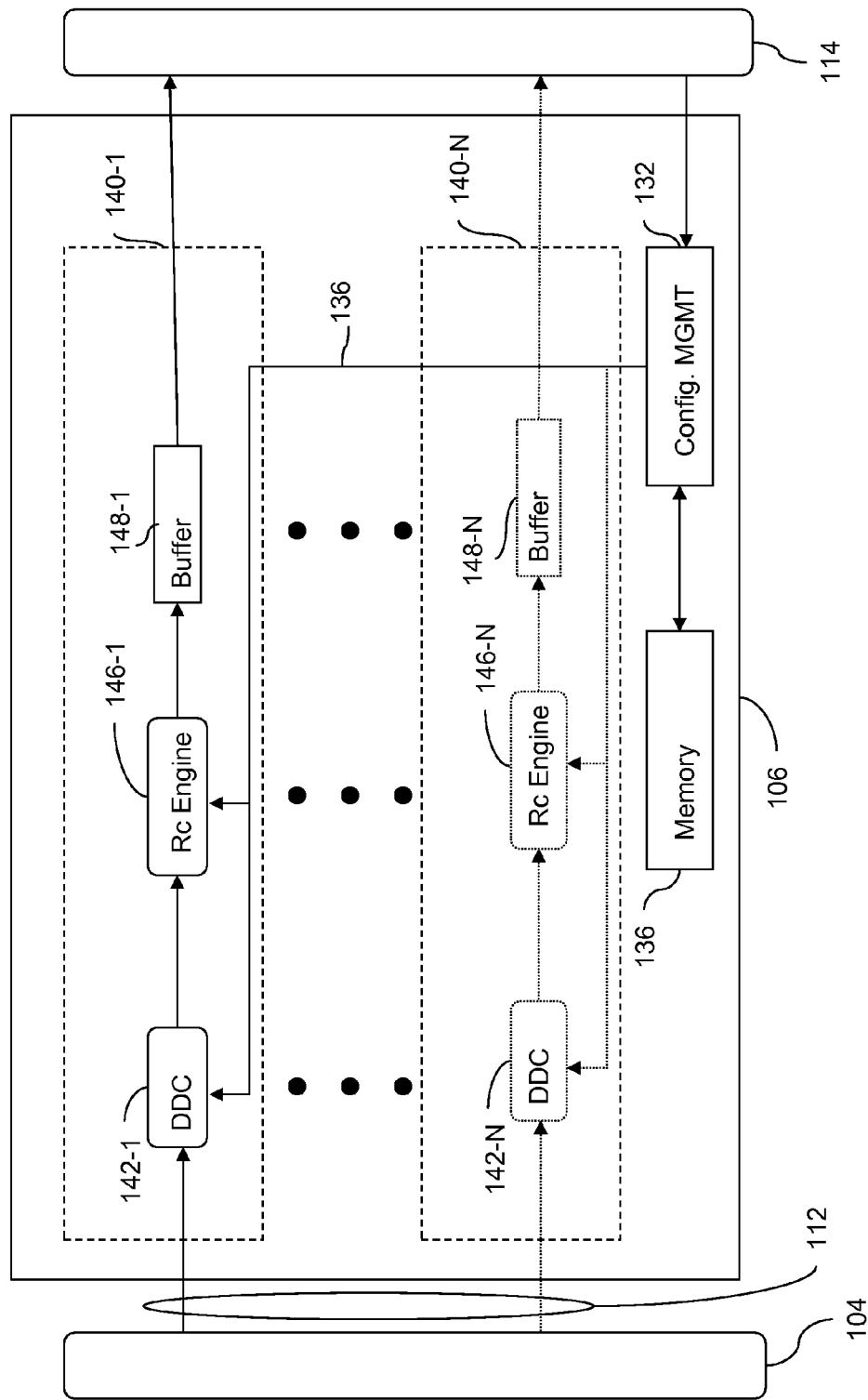

In FIG. 1C, one embodiment of the present invention for a reverse logical channel 140-1 data path is illustrated. A radio head interface 106 reverse logical channel 140-1 comprises a receiver buffer 148-1, a receive engine 146-1, and a DDC 142-1. In one embodiment, radio head interface card 106 comprises a plurality of N reverse logical channels 140-1 through 140-N each having receiver buffers 148-1 through 148-N, receive engines 146-1 through 146-N and DDCs 142-1 through 142-N. In operation, in one embodiment, subscriber unit 102 modulates representations of voice/data signals into a digital stream of representations of voice/data signals (a third set of complex RF data samples) modulated at a center frequency designated for the RF channel assigned to reverse logical channel 140-1. DDC 142-1 converts the digital stream into complex RF data samples modulated at an intermediate (or baseband) frequency used by call processing software 114. Receive engine 146-1 receives the complex RF data samples from DDC 142-1 and places them into a receiver buffer 148-1. As receiver buffer 148-1 fills, it creates a page of a fourth set of complex RF data samples. In one embodiment, the thirds set of complex RF data samples are 14 bit samples. In one embodiment, the fourth set of complex RF data samples are 16 bit samples. The completed page is subsequently received and processed by call processing software module 114. Embodiments of the present invention provide for dynamic readjustment of the signal power level (i.e. the signal gain) of the complex RF data signals received by call processing software 114 by reconfiguring DDC 142-1 with filter parameters that either increase of decrease the signal amplitudes of the complex RF data samples processed by DDC 142-1. In one embodiment, reverse logical channel 140-1 is a diversity logical channel.

In operation, in one embodiment, configuration management unit 132 receives information from call processing software module 114 to adjust the reverse link signal gain for logical channel 140-1. Configuration management unit 132 looks up the associated parameters for the desired signal gain from the table located in memory unit 136. Through control channel 134 configuration management unit 132 loads the appropriate filter coefficients to DDC 142-1. In one embodiment, DDC 142-1 is adapted with a buffer memory that holds the parameters received from configuration management unit 132. In one embodiment, an associate forward logical channel 130-1's transmit engine 126-1 sends a synchronization signal to DDC 142-1 to load the parameters from the buffer memory into DDC 142-1's active registers. Once the parameters are loaded into the active registers, logical channel 140-1 amplifies reverse link data samples based on the signal gain specified by call processing software module 114.

In one embodiment, configuration management unit 132 is adapted to know the transmitter power ratings for each modulation protocol supported by the radio head unit 104 hardware based on the parameter table stored in memory unit 136. In one embodiment, the transmitter power ratings are loaded into memory unit 136 during the initial configuration of communications system 100. In some embodiments, when call processing software module 114 instructs radio head interface 106 to adjust the signal power level beyond the range of radio head unit 104's transmitter power ratings, radio head interface 106 generates an error condition flag to call processing software module 114. In one embodiment, when call processing software module 114 instructs radio head interface 106 to adjust the signal power level at an invalid designated time, radio head interface 106 generates an error condition flag to call processing software module 114. In one embodiment, radio head interface 106 is adapted to disregard signal power level adjustment instructions from call processing software module 114 that result in the generation of an error condition flag.

Figure 2:
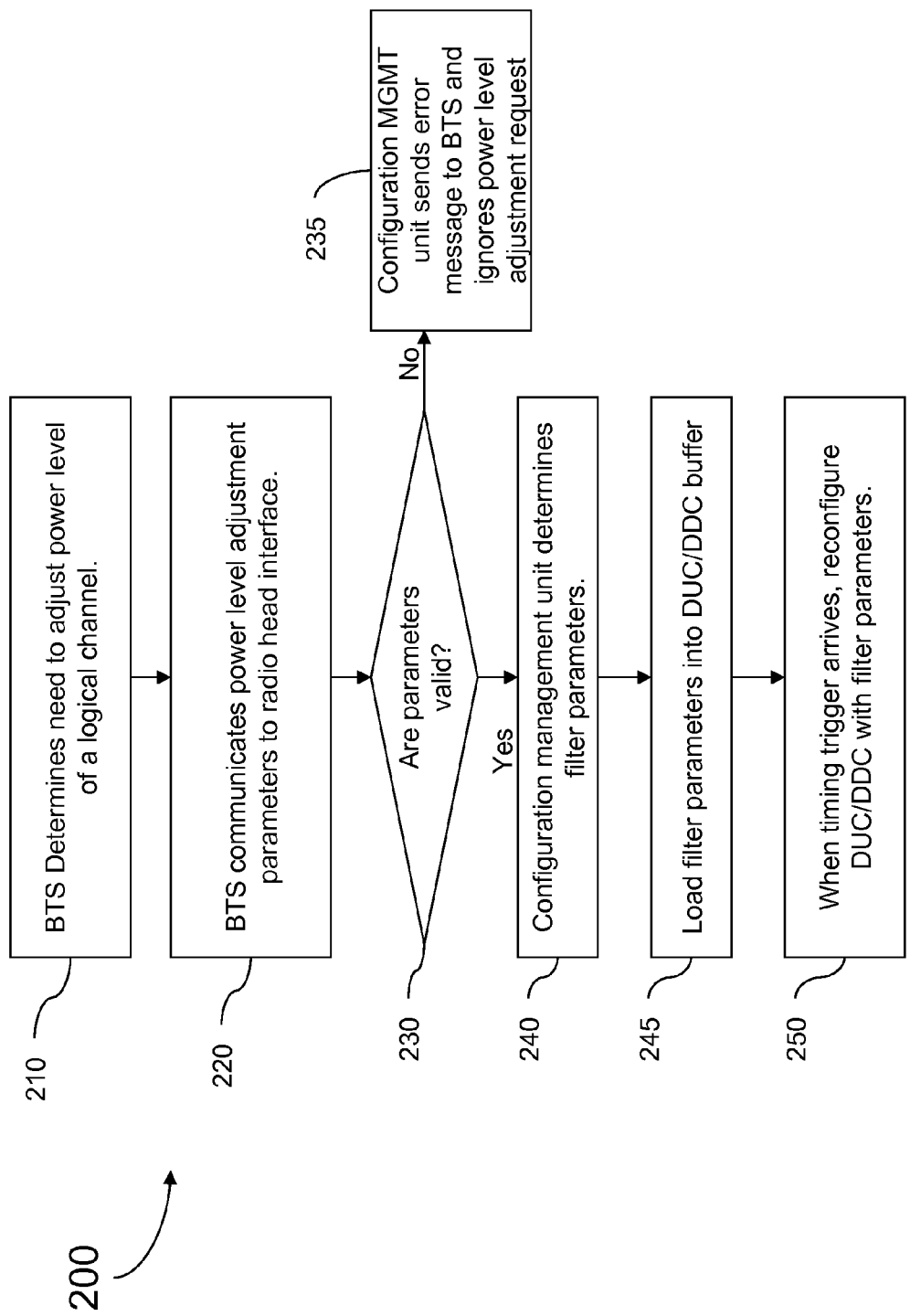
FIG. 2 is a flow chart of a method for practicing one embodiment of the present invention.

FIG. 2 is a flow chart of one embodiment of dynamic signal power level adjustments, based on the apparatus of FIGS. 1A, 1B and 1C of the present invention, shown generally at 200. A BTS determines the need to adjust the signal power level of a logical channel (210). The BTS communicates signal power adjustment parameters to a radio head interface (220). In one embodiment, signal power adjustment parameters include signal gain parameters and a timing trigger indicating when to perform the power level adjustment. In one embodiment, the timing trigger indicates a designated time based on a radio head interface internal clock. In one embodiment, the timing trigger is a specific data sample within a page of complex data samples. Next, the radio head interface determines whether the signal gain parameters are valid (230). In one embodiment, the radio head interface determines whether the signal gain parameters are valid for the radio head hardware coupled to the radio head interface. In one embodiment, the radio head interface further verifies that the timing trigger is valid, when the trigger is in the form of a designated time. When the signal gain parameters are valid, a configuration management unit determines the required DUC/DDC filter parameters (240) (DUC filter parameters for forward direction logical channels and DDC filter parameters for reverse direction logical channels). In one embodiment, the configuration management unit loads the filter parameters into DUC/DDC buffers (245). When the timing trigger arrives, the DUC/DDC is reconfigured to output digital signals with the new signal gain (250). In one embodiment, the radio head then begins transmitting RF signals at the new signal power level. In one embodiment, when the signal gain parameters are not valid, the radio head interface ignores the signal power level adjustment parameters sent by the BTS and in one embodiment, radio head interface then sends an error message to the BTS (235).

In one embodiment, signal power level adjustment parameters are communicated from call processing software module 114 to configuration management unit 132 through a page header. In one embodiment, call processing software module 114 outputs to logical channel 130-1's transmit buffer 128-1 a page of complex data samples representing voice and data communications. Prefixed to the data samples, is a page header that in one embodiment includes one or more of, but not limited to, a signal gain indicator (SGI), signal gain parameters, and a timing trigger. Further details concerning the communication of radio head interface module signal power adjustment parameters through page headers is described in the '675 application herein incorporated by reference.

In one embodiment, transmit engine 126-1 removes the page header from the page of complex RF data samples, sending only the complex RF data samples representing voice and data communications to DUC 122-1. Transmit engine 126-1 further evaluates the header for indicator flags. In one embodiment, when transmit engine 126-1 identifies an SGI flag, then one or more of, signal gain parameters and a timing trigger are further read from the page header and communicated to configuration management unit 132. As described previously, configuration management unit 132 then looks up associated filter parameters to reconfigure DUC 122-1. In one embodiment, the page header includes signal gain adjustment parameters for an associated reverse logical channel 140-1. In that case, transmit engine 126-1 communicates the signal gain parameters to configuration management unit 132 that then looks up associated filter parameters to reconfigure DDC 142-1.

Several ways are available to implement the radio head interface modules, software modules (e.g. call processing software modules), and BTS elements of the current invention. These include, but are not limited to systems such as, digital computer systems, programmable controllers, or field programmable gate arrays. Therefore other embodiments of the present invention are the program instructions resident on computer readable media which when implemented by such systems, enable the systems to implement embodiments of the present invention. Computer readable media include any form of computer memory, including but not limited to punch cards, magnetic disk or tape or any other magnetic storage system, any optical data storage system, flash ROM, non-volatile ROM, PROM, E-PROM or RAM, or any other form of permanent, semi-permanent, or temporary memory storage system or device.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A communications system, comprising:
   a base station including:
      one or more radio head interface modules; and
      a signal processing module, the one or more radio head interface modules adapted to communicate with the signal processing module;
      wherein the signal processing module performs modulation and demodulation of voice and data streams using one or more air interface protocols; and
   a radio head unit coupled to the one or more radio head interface modules over one or more transport mediums;
   wherein the radio head unit communicates with one or more subscriber units using the one or more air interface protocols;
   wherein the one or more radio head interface modules receive power level adjustment parameters from the signal processing module for one or more logical channels;
   wherein the one or more radio head interface modules reconfigure a signal gain of one or more communications channels based on the power level adjustment parameters.

2. The system of claim 1, wherein the base station further comprises:
   one or more interface devices, wherein the one or more radio head interface modules communicate with the signal processing module over the one or more interface devices.

3. The system of claim 2, wherein the one or more interface devices includes at least one of a PCI-X interface, a ATCA interface, a PCI Express interface, a Gigabit Ethernet interface, a SCSI interface, a Rocket I/O interface, a UDP/IP link interface, a TCP/IP link interface, a Serial ATA interface, a Card bus for PCMIA cards interface, a high speed serial interface and a high speed parallel interface.

4. The system of claim 1, wherein the one or more air interface protocols include at least one of Global System for Mobile communications (GSM), Advanced Mobile Phone System (AMPS), code division multiple access (CDMA), Wide-band CDMA, time division multiple access (TDMA), Cellular Digital Packet Data (CDPD), Enhanced Data rates for GSM Evolution (EDGE), General Packet Radio Service (GPRS), Integrated Digital Enhanced Network (iDEN), and Orthogonal Frequency Division Multiplexing (OFDM).

5. The system of claim 1, wherein the power level adjustment parameters include at least one of a signal gain indicator, signal gain parameters, and a timing trigger.

6. The system of claim 5, wherein the timing trigger is a designated time.

7. The system of claim 6, wherein the designated time correlates to a time count internal to the radio head interface module.

8. The system of claim 7, wherein the one or more radio head interface modules further comprises a global positioning system receiver, wherein the time count internal to the radio head interface module is synchronized with an output signal from the global positioning system receiver.

9. The system of claim 8, wherein the signal processing module is synchronized with an output signal from the global positioning system receiver.

10. The system of claim 5, wherein the timing trigger is a designated data sample.

11. The system of claim 1, wherein the signal processing module communicates one or more pages of data samples with the one or more radio head interface modules, each of the one or more pages of data samples having a page header;
   wherein signal gain adjustment parameters are contained in the page header.

12. The system of claim 1, wherein the transport mediums are one or more of twisted pair cable, optical fiber, millimeter wave, coaxial cable, and Free Space Optics (FSO).

13. The system of claim 1, wherein the one or more radio head interface modules further comprise:
   a transmit buffer, the transmit buffer adapted to receive a data stream from the signal processing module and store the data stream as a page of data samples;
   a transmit engine;
   a digital upconverter, wherein the transmit engine is adapted to transfer the page of data samples from the transmit buffer to the digital upconverter;
   a configuration management unit adapted to receive the power level adjustment parameters from the signal processing module; and
   a memory adapted with digital upconverter filter parameters;
   wherein the configuration management unit is further adapted to access the memory to lookup the digital upconverter filter parameters based on the power level adjustment parameters;
   wherein the configuration management unit is further adapted to output the digital upconverter filter parameters to the digital upconverter.

14. The system of claim 13, wherein the one or more radio head interface modules further comprise:
   a receive buffer;
   a receive engine; and
   a digital downconverter;
   the receive engine adapted to transfer a data stream from the digital downconverter to the receive buffer, the receive buffer adapted to store the data stream as a page of data samples, the receive buffer further adapted to output the page of data samples to the signal processing module;
   the memory further adapted with digital downconverter filter parameters;
   wherein the configuration management unit is further adapted to access the memory to lookup digital downconverter filter parameters based on the power level adjustment parameters;
   wherein the configuration management unit is further adapted to output the digital downconverter filter parameters to the digital downconverter.

15. A radio head interface module, the module comprising:
a transmit buffer, the transmit buffer adapted to receive a data stream from a signal processing module and store the data stream as a page of data samples having a page header;
a transmit engine;
a digital upconverter, the transmit engine adapted to transfer the page of data samples from the transmit buffer to the digital upconverter;
a configuration management unit adapted to receive power level adjustment parameters from the signal processing module; and
a memory adapted with digital upconverter filter parameters;
wherein the configuration management unit is further adapted to access the memory to lookup associated digital upconverter filter parameters based on the power level adjustment parameters;
wherein the configuration management unit is further adapted to output the associated digital upconverter filter parameters to the digital up converter.

16. The radio head interface module of claim 15, the module further comprising:
a receive buffer;
a receive engine; and
a digital downconverter;
the receive engine adapted to transfer a data stream from the digital downconverter to the receive buffer, the receive buffer adapted to store the data stream as a page of data samples, the receive buffer further adapted to output the page of data samples to the signal processing module;
the memory further adapted with digital downconverter filter parameters;
wherein the configuration management unit is further adapted to access the memory to lookup the associated digital downconverter filter parameters based on the power level adjustment parameters; and
wherein the configuration management unit is further adapted to output the associated digital downconverter filter parameters to the digital downconverter.

17. A communication system comprising:
a signal processing module;
a radio head interface module;
a radio head unit;
means for embedding channel signal gain parameters into a page header of a page of a first set of RF data samples;
means for communicating the page of the first set of RF data samples and page header from the signal processing module to the radio head interface module;
means for extracting the channel signal gain parameters from the page header;
means of communicating a second set of RF data samples from the radio head interface module to the radio head unit; and
means for adjusting the signal gain of the second set of RF data samples based on the channel signal gain parameters.

18. The communication system of claim 17 further comprising:
means of communicating a third set of RF data samples from the radio head unit to the radio head interface module;
means of communicating a page of a forth set of RF data samples from the radio head interface to the signal processing module; and
means for adjusting the signal gain of the forth set of RF data samples based on the channel signal gain parameters.

* * * * *